United States Patent [19]

Tseng

[11] Patent Number: 5,000,057

[45] Date of Patent: Mar. 19, 1991

[54] FULLY ENGAGED TRANSMISSION

[76] Inventor: Sheng-Tsai Tseng, No. 5-3 Chia An West Rd., Chia An Tsun, Long Tan Hsian, Taoyuan Hsien, Taiwan

[21] Appl. No.: 393,513

[22] Filed: Aug. 14, 1989

[51] Int. Cl.$^5$ ............................................. F16H 3/08
[52] U.S. Cl. ...................................... 74/359; 74/333; 192/48.92
[58] Field of Search ................ 74/333, 356, 357, 359, 74/360, 335, 336 R; 192/48.6, 48.7, 48.8, 48.92, 415, 84 C, 93 R, 93 C, 103 B

[56] References Cited

U.S. PATENT DOCUMENTS

| | | | |
|---|---|---|---|
| 1,861,931 | 6/1932 | Moldenhauer | 74/359 |
| 1,950,163 | 3/1934 | Cotterman | 192/48.6 X |
| 2,001,762 | 5/1935 | Blood | 192/48.92 X |
| 2,028,028 | 1/1936 | Tyler | 192/48.8 |
| 2,660,899 | 12/1953 | McCammon | 74/359 X |
| 2,725,758 | 12/1955 | Dickey | 74/359 |
| 2,872,828 | 2/1959 | Brogdon | 192/48.92 X |
| 3,321,986 | 5/1967 | Chappell et al. | 192/48.92 X |
| 3,451,512 | 6/1969 | Sacchini et al. | 192/415 X |
| 4,282,775 | 8/1984 | Van Dest | 74/360 X |
| 4,398,432 | 8/1983 | Quick | 74/360 X |
| 4,437,552 | 3/1984 | Toyama | 192/48.92 X |
| 4,527,491 | 6/1985 | Dittmann, Jr. | 74/360 |
| 4,640,146 | 2/1987 | Buback | 74/333 X |

FOREIGN PATENT DOCUMENTS

53-13049  2/1978  Japan .................. 192/48.92

*Primary Examiner*—Dwight Diehl
*Attorney, Agent, or Firm*—Asian Pacific International Patent & Tradmark Office

[57] ABSTRACT

The present invention is to make use of fully engaged gear sets to transmit engine power, by means of untwisting or twisting tight the springs in the gear sets to selectively lock up other gear sets for power transmission so as to form into several spaced driving transmission gear rations in proper sequence, such that shift operation can be made during continuously stepping on the accelerator. Through a microprocessor, the shift operation is efficiently performed according to the revolving speed of the engine so as to let the car engine produce maximum performance all the time.

9 Claims, 10 Drawing Sheets

FIG.14-1

FULLY ENGAGED TRANSMISSION

BACKGROUND OF THE INVENTION

The present invention is related to a transmission, and more particularly to a fully engaged transmission.

Following fast economic development in recent years, the buying of a car to serve as a means of transportation is no longer a luxury. Every car driver knows that it is easier to drive a car with an automatic shift than a car with a manual shift. In driving a car with a manual shift, the driver, during every gear shifting procedure, must release the accelerator and step on the clutch, and then, step on the accelerator and release the clutch after the gear shifting lever is properly shifted in. The gear shifting procedure requires six sequential movements. Therefore, when the gear shifting procedure is repeatedly performed in a crowded street, a driver will naturally become oblivious to danger. Moreover, the accelerator must be released when shifting, and therefore the speed of the car is reduced, causing a loss of power. While climbing a hill, if the gear is not properly shifted, engine stalling may result. Because the gear shifting procedure is complicated, the driver is often disinclined to shift so that the car engine may be operated at improper speed so as to increase fuel consumption or possibly damage the engine. As a consequence, incomplete combustion of fuel deteriorates the quality of the air. The above problems will not be encountered while driving a car having an automatic shift. However, an automatic shift transmission is very complicated and expensive to manufacture and maintain, generally comprising planetary gear set, clutch brake device and control devices. Therefore, the power consumption of the automatic shift transmission is 18% greater than that of manual shift transmission.

Conventional automatic shift transmissions and manual shift transmissions can not meet the present requirements, so continuously variable transmissions (CVT) have been successfully developed and first applied in the cars of the model Justy manufactured by Subaru Japan. This kind of transmission has two points of advantage, one of which is that the structure is very compact and simple, the other of which is that the engine can provide maximum performance at an given engine speed. However, there are two points of disadvantage. The first one is that tardiness of speed change may require the operator to sometimes violently step on the accelerator to shift, and the second one is that the chain of power transmission is clipped by the pulley.

Nowadays, the excessive consumption of energy and damage to the environment are problems associated with the automobile. Thus, a kind of engine with low fuel consumption and reduced air pollution is a worldwide development goal; also a kind of fully engaged transmission is necessary to urge the development.

SUMMARY OF THE INVENTION

The main object of the present invention is to provide a fully engaged transmission using a microprocessor to automatically control the shifting procedure according to the revolving speed of the engine and to let the engine drive the transmission properly at any time.

Another object of the present invention is to provide a fully engaged transmission which transmits power by means of fully engaged gears and which has a simple structure and is convenient to operate.

A further object of the present invention is to provide a fully engaged transmission wherein speed change can be easily performed during continuously stepping on the accelerator, and wherein the number of transmission gears can be increased without complicating the whole structure, so as to achieve a performance as stable and powerful as continuously variable transmission.

According to the present invention, a fully engaged transmission includes an input gear assembly, an output gear assembly, an actuating assembly, a back gear, a forwards shift mechanism, and a shift selector. The input gear assembly includes a plurality of input gears in number equal to the speed steps available, and an input shaft for transmitting engine power to the input gears, wherein the input shaft is inserted from the second smallest input gear through the other input gears of larger diameter in proper sequence from the third smallest to the largest, and wherein the power transmission is sequently controlled by the springs set in the input gears according to the sequence from the largest toward the second smallest gear. The springs are automatically torsionally tightened or loosened to transmit power or stop the power transmission. The smallest input gear is connected with the input shaft by means of a key so as to follow the input shaft to rotate.

The output gear assembly includes a plurality of output gears in number equal to the input gears and a drive shaft. The drive shaft is inserted from the smallest output gear through the other output gears of larger diameter in proper sequence from the second smallest to the largest, wherein the power transmission is made by the springs of the output gears in a manner that the springs are torsionally loosened or tightens to couple with the associated output gears or the drive shaft to let the output gears and the drive shaft revolve concomitantly. When the revolving speed of an output gear which has larger diameter is slower than another gear which has smaller diameter, the spring will automatically be released from the associated shaft or clutch surface. The output gears from the largest to the smallest are arranged to engage with the input gears from the smallest to the largest so as to provide a driving transmission gear ratio for operation at respective speed.

The actuating gear assembly includes an output shaft, a back driven gear and an idle gear. Similar to the input gears, the back driven gear and the output shaft are equipped with torsion springs, which are properly controlled such that the power from the drive shaft may be transmitted to the output shaft to form a forward shift condition; the power from the input shaft may be transmitted to the output shaft through the idle gear to form into a backward shift; or the output shaft may be released to provide a neutral shift condition.

Each input gear is connected a drive ring set in the forward shift mechanism. A worm gear is driven by a stepping motor controlled by a microprocessor, which worm gear is engaged with a worm provided by the forward shift mechanism so as to select the appropriate shift position by means of the microprocessor to let car engine produce maximum performance.

To properly control the drive rings of the input gears the input shaft transmits the engine power to the input gear which is responsible for the first speed, that is, the smallest input gear and the engaged output gear provide a driving transmission gear ratio at the first speed, and the springs of the other output ears are automatically twisted tight to let the output gear of the first speed range drive the other output gears and the drive shaft.

For higher speed operation, the forward shift mechanism is operated to let the power be transmitted from the input shaft to the input gear responsible for the speed concerned and the input gears of lower speed so as to further dive the relatively engaged output gears to rotate simultaneously, wherein the output gear responsible for the speed concerned has the highest revolving speed, and therefore, its spring and the springs of the output gears from higher speed are automatically twisted tight on the output drive shaft to let the output gears for higher speed and the drive shaft rotate simultaneously at a constant speed to form into a driving transmission gear ratio at the speed concerned, while the springs of the output gears for lower speed are automatically torsionally released from the output drive shaft so as to let the output gears for lower speed be revolving separately without interfering with the output gear for the speed concerned.

The above and other objects, features and advantages of the present invention will become more apparent from the following detailed description considered in connection with the annexed drawings as hereunder.

BRIEF DESCRIPTION OF THE DRAWINGS

FIG. 11-1 to 11-5 are side sectional drawings, illustrating the position of the drive rings of the input gears in the forward shift mechanism from the first speed to the fifth speed;

FIGS. 14-1 to 14-3 are side sectional drawings of the shift selector respectively in the backward, neutral and forward shift position;

DETAILED DESCRIPTION OF THE PREFERRED EMBODIMENTS

Figure 1:
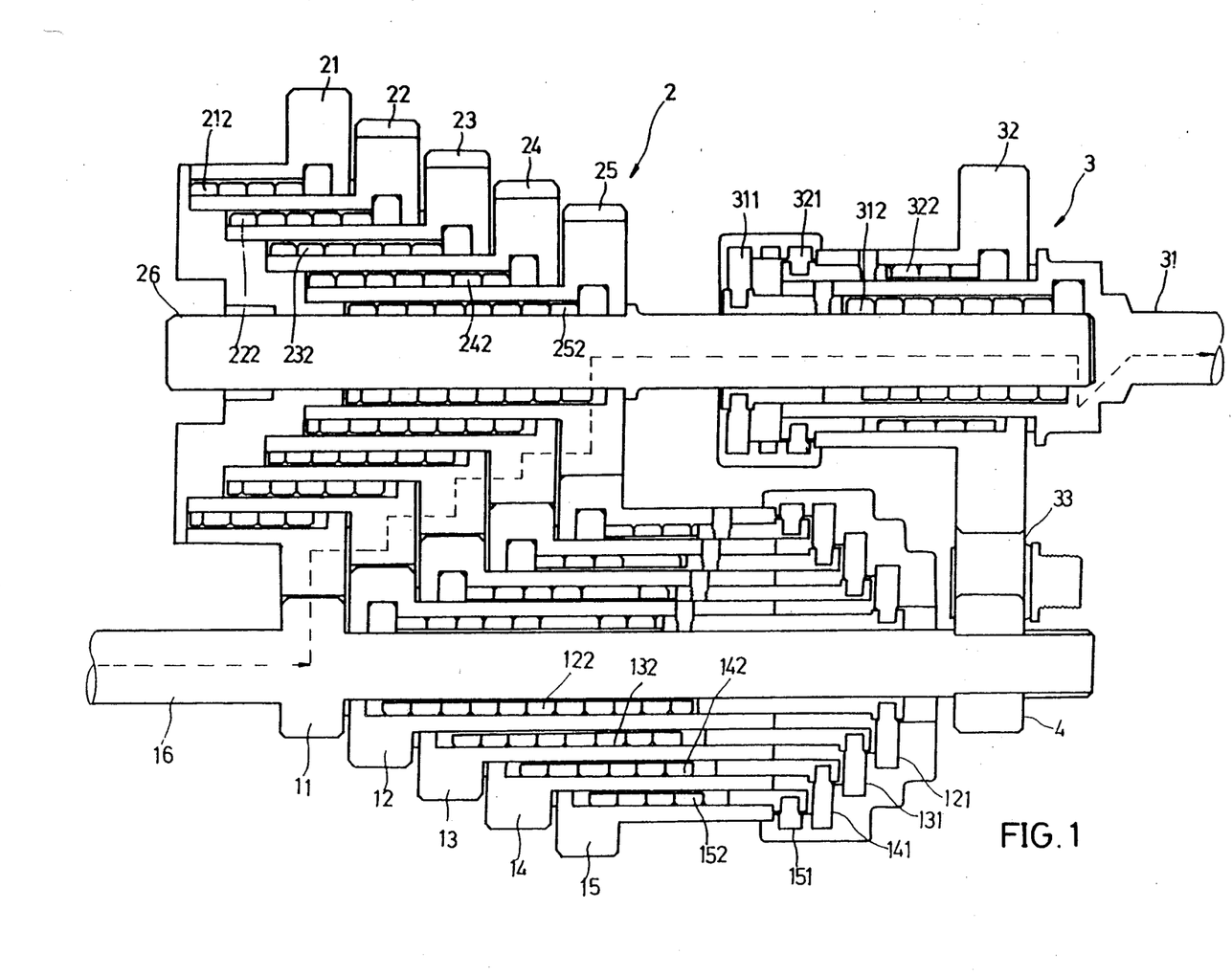
FIG. 1 is a side sectional view of the present invention, illustrating the operation and the related power transmission route (as indicated in dotted line) at the first speed.

Referring to FIG. 1, a fully engaged transmission includes an input gear assembly, an output gear assembly 2, an actuating gear assembly 3, and a back gear 4. A forward shift mechanism 5 (FIGS. 9 and 10), and a shift selector (FIGS. 12 and 13) form additional component parts of the transmission. The input gear assembly 1 includes a plurality of input gears 11, 12, 13, 14 and 15 with a diameter relatively increased in proper sequence (the number of the input gears is equal to the number of speed steps available), and an input shaft 16, wherein the input shaft 16 is inserted from the second smallest input gear through the other input gears of larger diameter in proper sequence from the third smallest to the largest, that is, the input shaft 16 is inserted from the input gear 12 through the input gears 13, 14 and 15. The above power transmission is controlled by the springs 152, 142, 132 and 122 of the input gears 15, 14, 13, and 12 according to the sequence from the largest 15 toward the second smallest gear 12, that is, the springs are automatically twisted tight on the respective encircled clutch surfaces or loosened from those surfaces to transmit power or stop the power transmission. The input gear 11 which has the smallest diameter is provided with the input shaft 16 my means of a key so as to follow the input shaft 16 to rotate.

Figure 2:
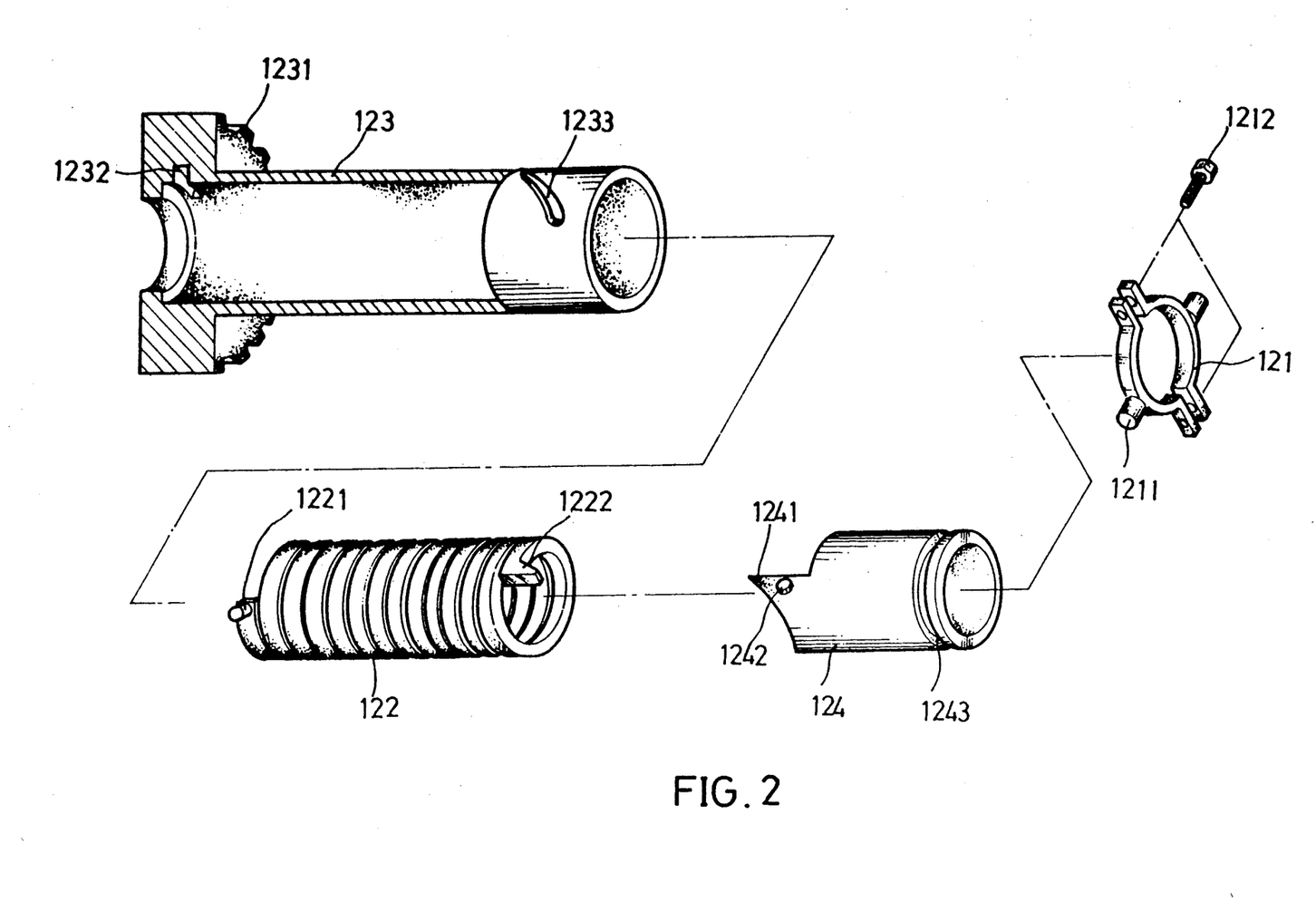
FIG. 2 is a perspective fragmentary view of the input gear.
Figure 3:
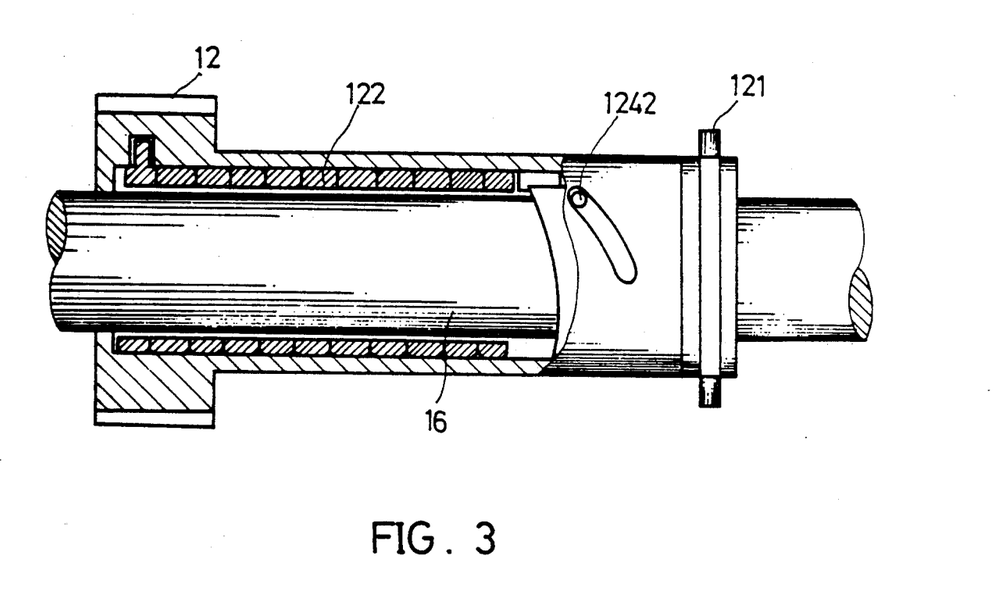
FIG. 3 is a side sectional view of the input gear, illustrating the input shaft and the input gear being to revolve separately.
Figure 4:
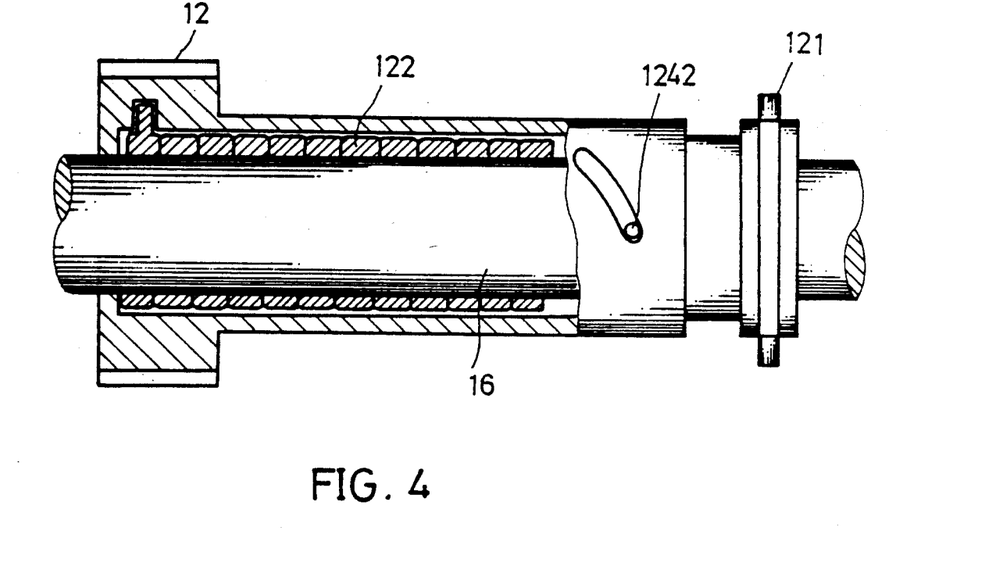
FIG. 4 is a side sectional view of the input gear, illustrating the input shaft and the input gear being to revolve concomitantly.

The input gears in diameter from the second smallest to the largest 12-15 are similar in structure. As shown in FIG. 2, the input gear has associated therewith an axially movable drive ring 121, a spring 122, a gear bushing 123, and a drive sleeve 124. In normal condition when no torsional force is applied, the inner diameter of the spring 12 is smaller than the outer diameter of the input shaft 16. Therefore, a torsional force in reverse direction must be applied to expand the spring 122 to permit insertion of the input shaft 16. When the negative torsional force is removed, the spring 122 will automatically twist tight on the input shaft 16. The gear bushing 123 is, a hollow bushing, having a gear 1231 integrally made at one end, and has an inner diameter slightly larger than the outer diameter of the spring 122 and the drive sleeve bushing 124, and a groove 1232 on the inner wall near the top end for setting therein of the stub tenon 1221 of the spring 122 so as to limit the spiral motion of the spring 122 within a certain range. The drive bushing 124 has a triangular projection 1241 to stop against the triangular extension 1222 of the spring 122. The drive ring 121 is revolvingly mounted in the circular groove 1243 of the drive sleeve 124 by means of two screws 1212. The drive sleeve bushing 124 has a stub tenon 1242 on the triangular projection 1241 to set in the elongated bevel notch 1233 formed in the side wall of the gear bushing 123 near the bottom end. The stub tenons 1211 of the drive ring 121 are set in the forward shift mechanism 5 shown in FIGS. 9 and 10. When the stub tenons 1211 are moved rightward by the forward shift mechanism, the stub tenon 1242 of the drive sleeve 124 will be moved along the elongated bevel notch 1233 to the limit (as shown in FIG. 4) to let the spring 122 be released from torsional force to twist tight or the input shaft 18, that is, the revolving of the input shaft 16 will drive the input gear 12 to rotate, as shown in FIG. 4. When the ring 121 is moved leftward to the FIG. 3 position, the stub tenons 1242 of the drive sleeve 124 will be driven to move along the elongated bevel notch 1233 of the gear bushing 123 to the upper limit to apply a torsional force on the spring 122 so as to expand the spring 122 and to let the input shaft 16 and the input gear 12 revolve independently, as shown in FIG. 3.

Figure 5:
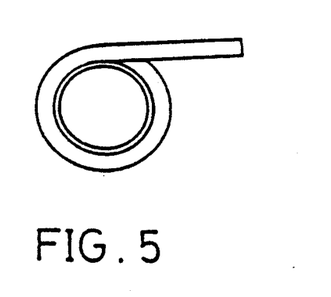
FIGS. 5 and 5A are sectional view of the spring of the output gear and the drive shaft, illustrating the output gear and the drive shaft being to revolve separately.
Figure 5A:
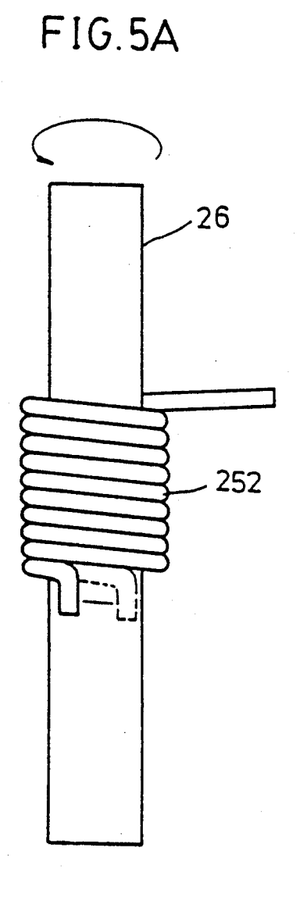
Figure 6:
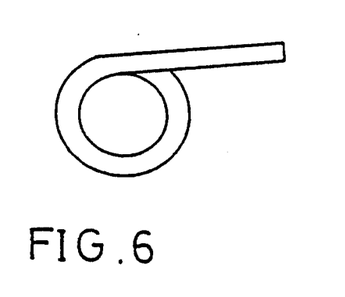
FIGS. 6 and 6A are sectional views of the spring of the output gear and the drive shaft, illustrating the output gear and the drive shaft being to revolve concomitantly.
Figure 6A:
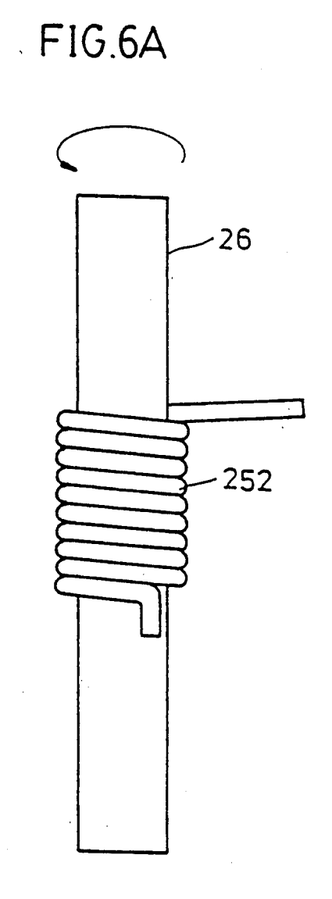

The output gear assembly 2, as shown in FIG. 1 includes a plurality of output gears 21-25 in number equal to the input gears and arranged in diameter according to proper sequence from the largest to the smallest, and a drive shaft 26. The drive shaft 26 is inserted from the smallest output gear through the other output gears of larger diameter in proper sequence from the second smallest to the largest, that is, the drive shaft 26 is inserted from the smallest output gear 25 through the other output gears 24-21 in an order from the second smallest to the largest. The output gears from the smallest to the largest are engaged with the input gears from the largest to the smallest, that is, the output gears 21, 22, 23, 24 and 25 are respectively engaged with the input gears 11, 12, 13, 14 and 15 to produce a respective driving transmission gear ratio according to the shift. The output gear 25, same as the other gears 21-24, has a gear bushing (not shown) and a spring 252. The outer diameter of the drive shaft 26 is larger than the inner diameter of the spring 252, so a reverse torsional force must be applied on the spring 252 to expand for setting therein of the shaft 26. As soon as the reverse torsional force is removed the spring 252 will produce a positive torsional force to twist tight on the shaft 26. The spring 252 has an extension (FIG. 5) set in the notch of the gear bushing such that the spring 252 is only permitted to make a spiral motion. If the revolving speed of the spring 252 is higher than the revolving speed of the shaft 26, the revolving direction of the shaft 26 is contrary to the spiral direction of the spring 252, and the spring 252 will automatically twist tight on the shaft 26 to revolve together as shown in FIG. 6. If the revolving speed of the shaft 26 is higher than the revolving speed of the output gear 25, the revolving direction of the shaft 26 is to follow the spiral direction of the spring 252, and the spring 252 will be released from the shaft 26 to let the shaft 26 and the output gear 25 rotate independently as shown in FIG. 5.

The actuating gear assembly 3 includes an output shaft 31 and a back driven gear 32. Similar to the input gears, the output shaft 31 and the back driven gear 32 are associated with drive rings 311 and 321, and springs 312 and 322. The drive shaft 26 extends within the output shaft 312 insert in the back driven gear 32, wherein the power transmission therebetween is made by means of the spring 312 and 322 controlled by the respective drive rings 311 and 321. The back driven gear 32 is engaged with an idle gear 33 which is further engaged with a back gear 4 linked with the input shaft 16.

Figure 111:
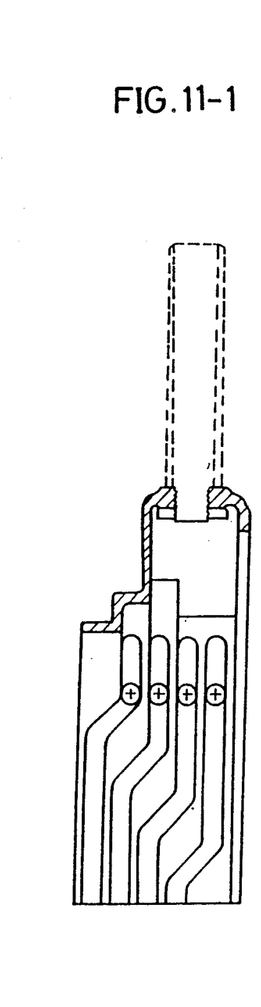
Figure 112:
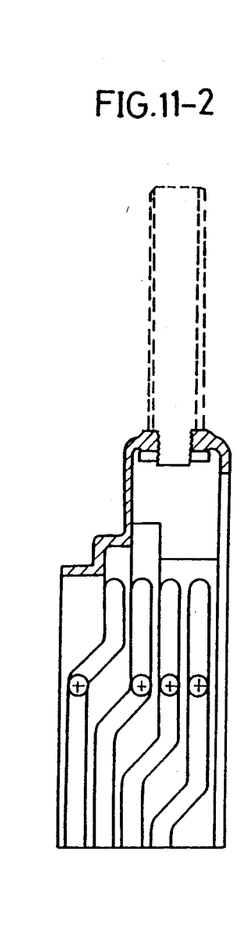
Figure 113:
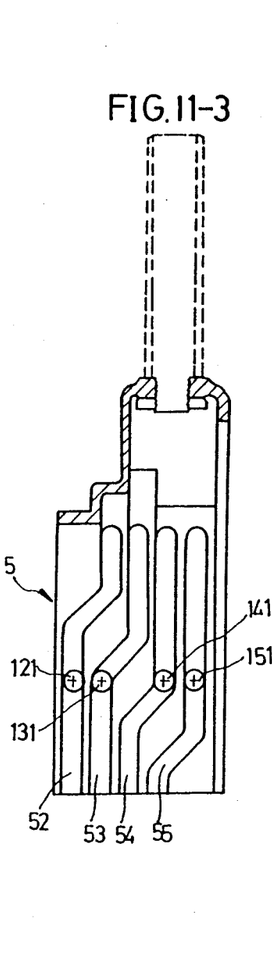
Figure 114:
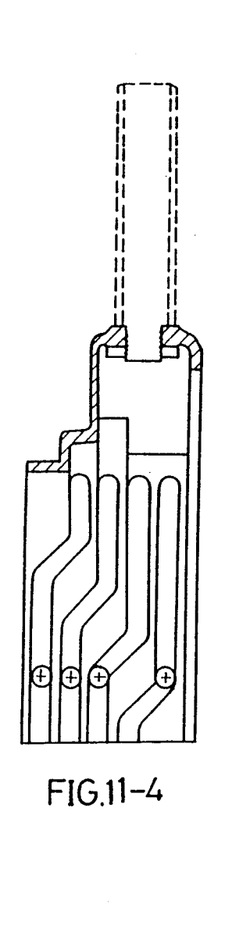
Figure 115:
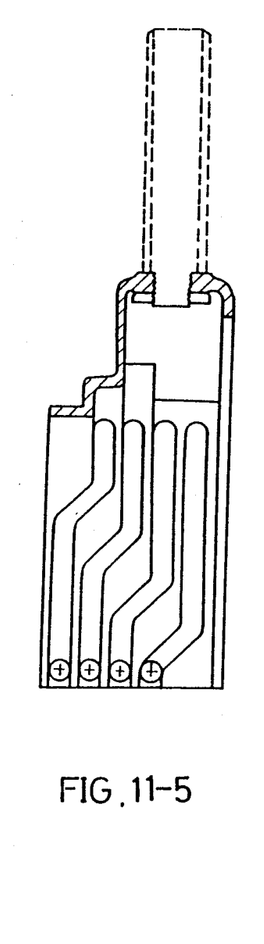
Figure 141:
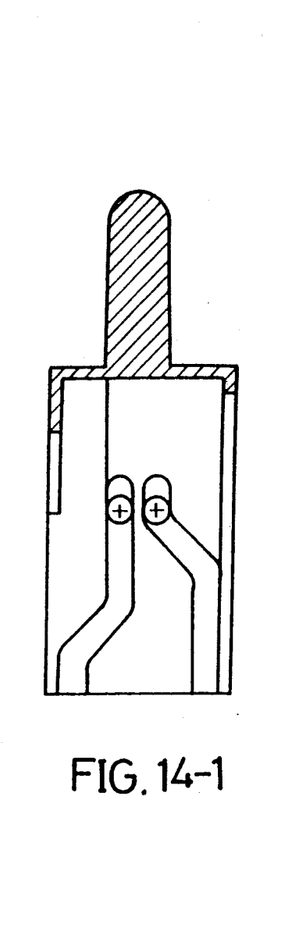
Figure 142:
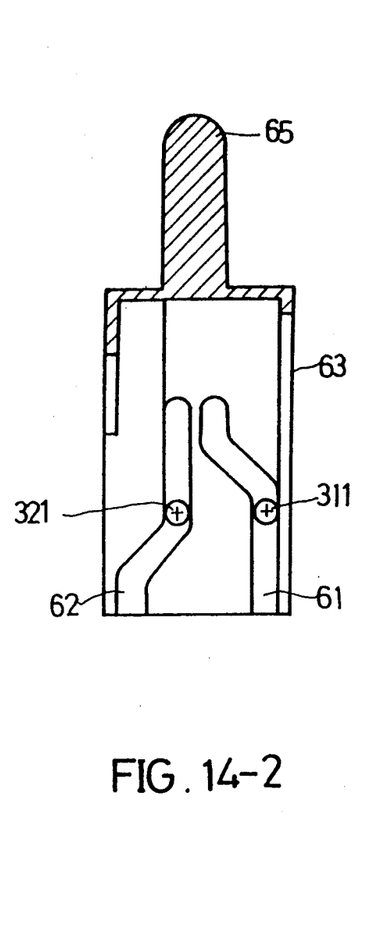
Figure 143:
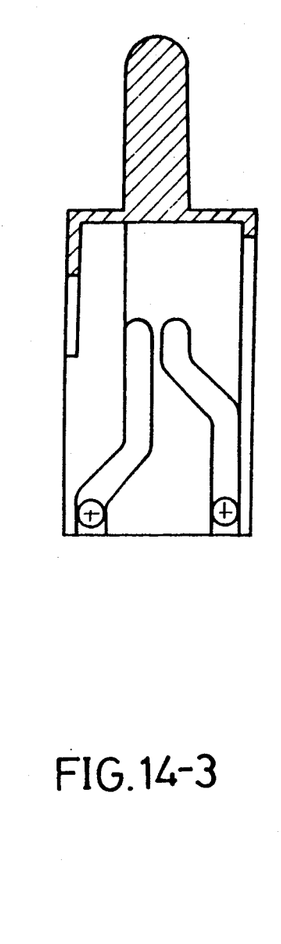

Please refer to FIG. 1 which is a side sectional view of the present invention when operated at the first speed. The drive rings of the input gears 121-125 are shifted to the left by the forward shift mechanism 14, as shown in FIG. 11-1, to let the springs 122-152, which are respectively set in the input gears in diameter from the smallest to the largest, be twisted loose on shaft 6 so as to let the input shaft 16 drive the smallest input gear 11, which controls the first speed, to rotate, the other input gears 12-15 the input shaft 16. Because the output gear 21 is driven to rotate and its spring 212 is automatically twisting tight on the output gear 22, the output gear 22 is driven to rotate simultaneously, and therefore, the other output gears 23, 24 and 25, and the drive shaft 26 are sequentially driven to rotate to further drive the engaged input gears 12, 13, 14 and 15 to rotate concomitantly. At the same time, the drive rings 311 and 321 in the shift selector are properly controlled, as shown in FIG. 14-1, to twist tight the spring 312 in the output shaft 31, and to torsionally the spring 322 in the back driven gear 32 from shaft 31, such that the revolving of the drive shaft 26 drives only the output shaft 31.

Figure 7:
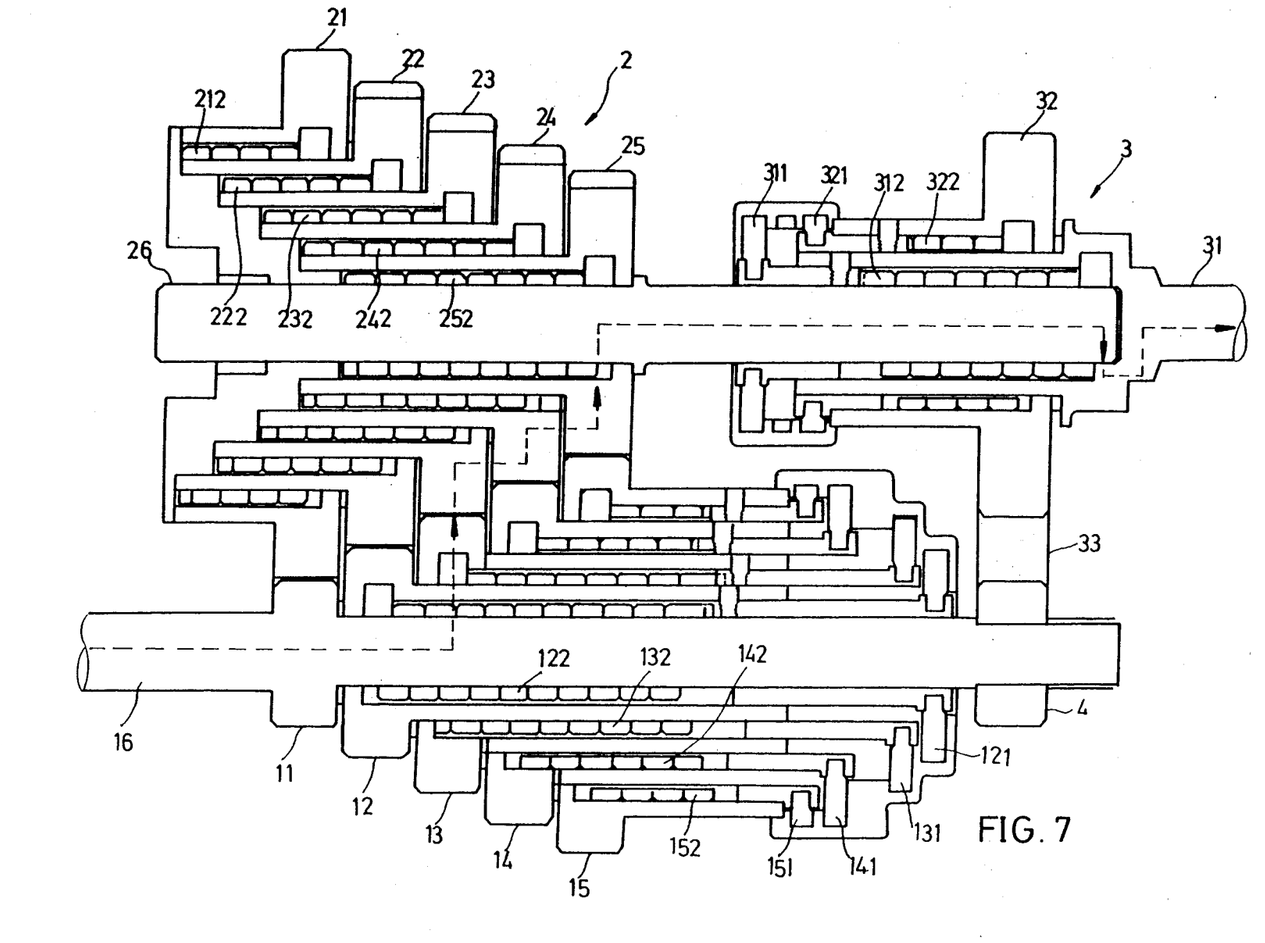
FIG. 7 is a schematic drawing of the present invention, illustrating the operation and its power transmission route (as indicated in the dotted line) at the third speed.

Please refer to FIG. 7, which is a side sectional view of the present invention operated at the third speed. The forward shift mechanism (FIGS. 9 and 10) is operated to let the drive rings 121 and 131 of the second and the third smallest input gears 12 nd 13 be shifted to the right, and to let the drive rings 141 and 151 of the other input gears be shifted to the left, as shown in FIG. 11-3. That is, the springs 122 and 132 in the gears of the second and the third smallest 12 and 13 are automatically twisted tight on the encircled drive clutch surfaces. Thus, the input shaft 16 will drive the input gears 11, 12 and 13 to rotate at constant speed, so as to drive the engaged output gears 21, 22 and 23 to rotate concomitantly. Because the revolving speed of the smallest output gear 23 is the faster, the spring 232 of the smallest output gear 23 will automatically twist tight the output gear 24 to drive the output gear 24 to rotate to further drive the output gear 25 and the drive shaft 26 to rotate at a constant sped; and also to drive the engaged input gears 14 and 15 to rotate concomitantly. Because the springs 142 and 152 are twisted loose on the encircled drive surfaces the input gears 14 and 15 will not interfere with others. The revolving speed of the output gear 23 is higher than the output gear 22, so the spring 222 will automatically ge released, and because the revolving speed of the output gear 22 is higher than the output gear 21, both gears will be separated to rotate independently. When the actuating gear assembly 3 is changed to the first gear, the transmission output shaft 31 will follow the drive shaft 26 to rotate at a constant speed, which revolving speed will be higher than that at the first gear position, that is, the higher the gear position, the higher the revolving speed and the lower the torsional force.

In conclusion, as described above, the gears responsible for transmission gear ratio from the lowest to the highest are respectively the input gear of diameter from the smallest to the largest and the engaged output gears. During shifting procedure, if it is made to shift from low speed to high speed, the spring of the high speed input gear will automatically twist tight the low speed input gear, that is, the power is immediately transmitted to the high speed input gear, to drive the engaged output gear to rotate at a higher speed, and at the same time, the spring of the low speed output gears will automatically get released to let power be transmitted by the high speed output gears. Therefore, no interruption of power transmission will happen during sped changing process, and one may continuously step on the accelerator. On the contrary, interruption of power transmission will neither happen when the speed is changed from high speed to low speed. The more the input and output gears are provided, the difference of transmission gear ratio will become as smaller as continuously variable transmissions.

Figure 8:
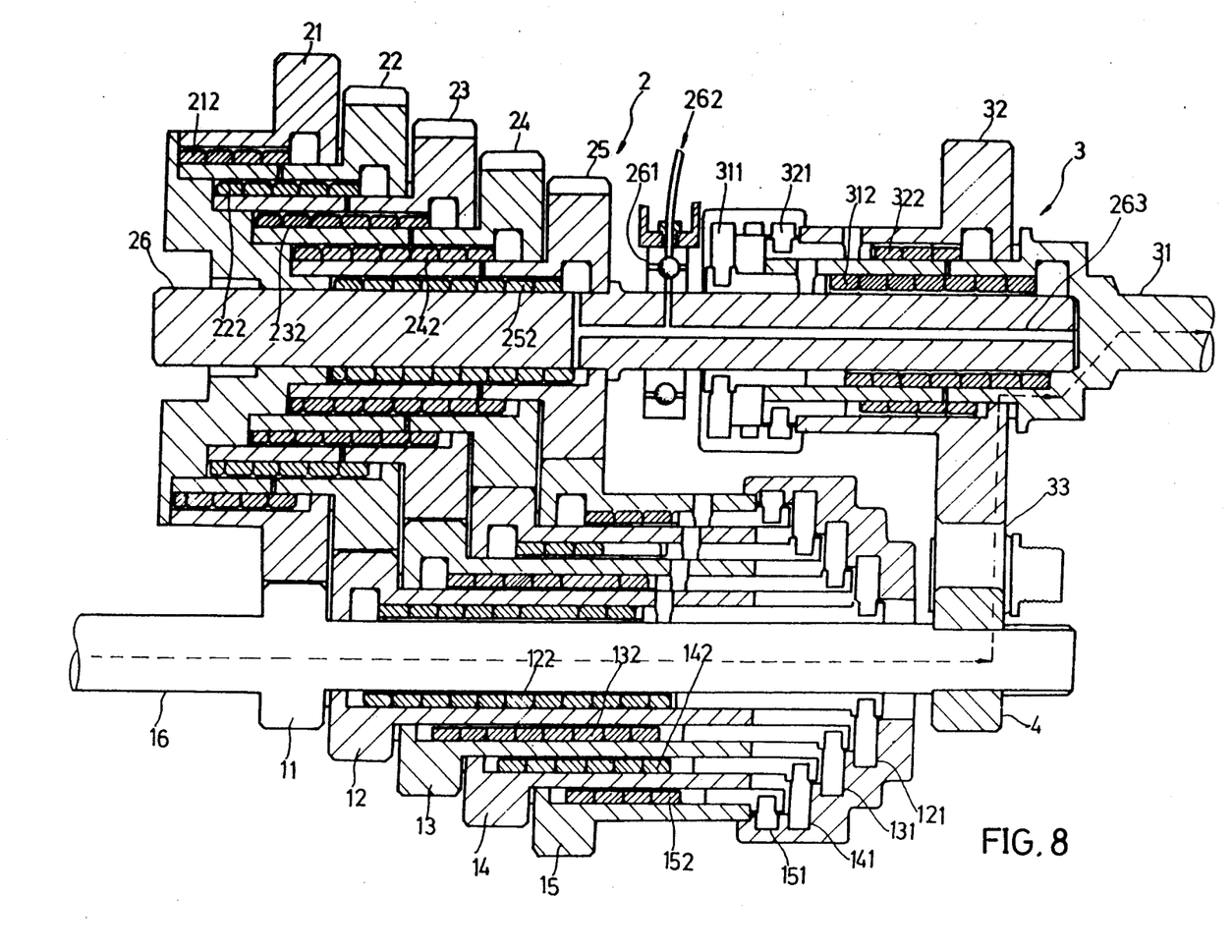
FIG. 8 is a schematic drawing of the present invention, illustrating the operation under a backward shift and the related power transmission route (as indicated in the dotted line)

Please refer to FIG. 8, which is a side sectional view of the present invention operated in the backward shift position. When the shift selector (FIGS. 12 and 13) is shifted to the backward shift position, the spring 312 of the output shaft 31 is torsionally released from shaft 26 by the drive ring 311 while the spring 322 of the back driven gear 32 is twisted tight on the encircled section of shaft 31 by the drive ring 321 as shown in FIG. 14-3. At the same time, the output shaft 31 does not receive the power from the drive shaft 26 but it receives the power transmitted from the input shaft 16. Through the effect of the idle gear 33, the output shaft 31 is therefore driven to rotate reversely.

Figures 9, 10:
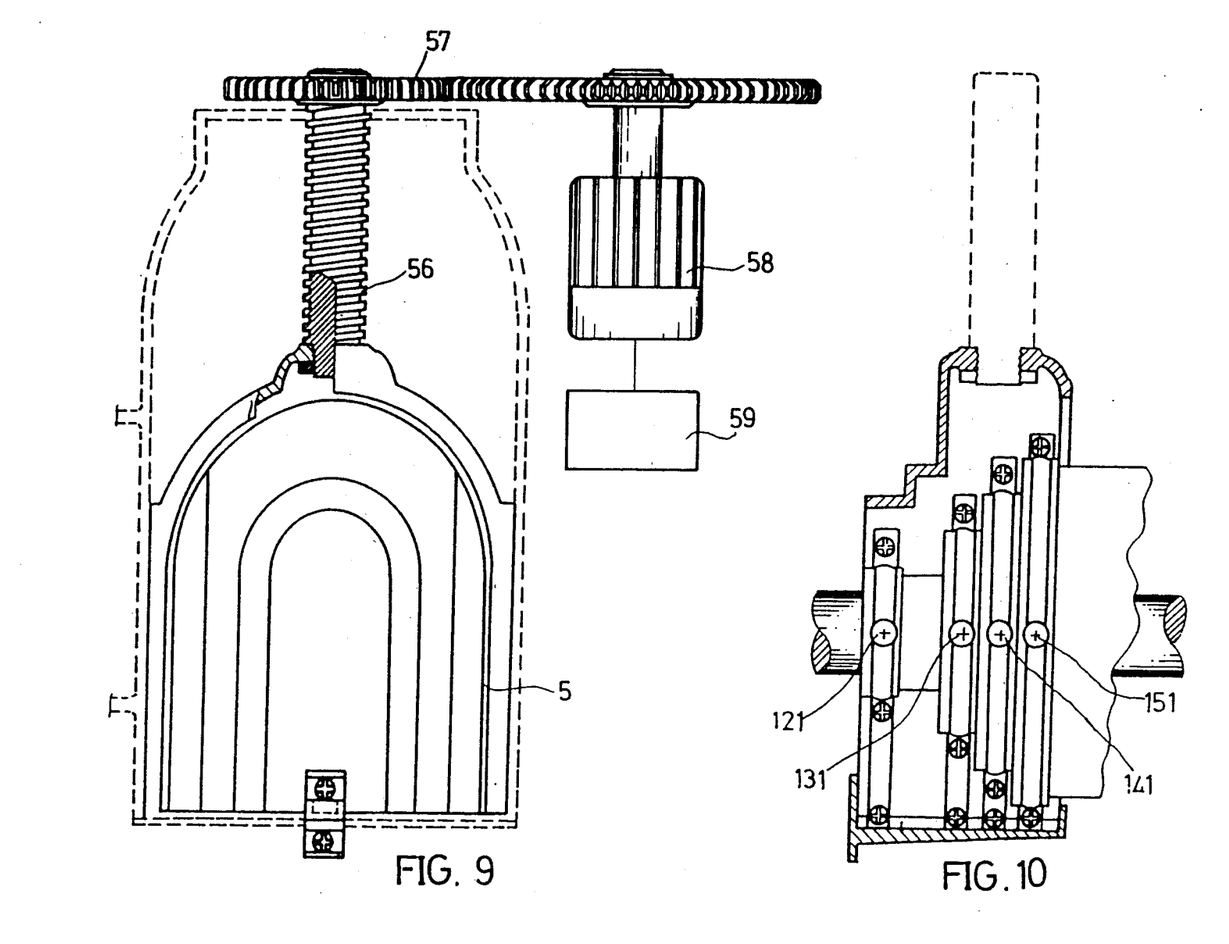
FIG. 9 is a side view of the forward shift mechanism.
FIG. 10 is a sectional view of the forward shift mechanism.

Referring to FIG. 9, 10 and 11, the forward shift mechanism includes zigzag shaped rails 52, 53, 54 and 55 arranged in number equal to the drive rings of the input gears, a worm 56, and a worm gear 57, wherein gear 57 has an internal thread is engaged with the worm 56 which is connected to the zigzag rails 52-55 (shown in FIG. 11-3). A microprocessor is provided to control a stepping motor according to the revolving speed of the engine, so as to drive the worm gear 57 to rotate and to further drive the worm 56 and the plural zigzag rails 52, 53, 54 and 55 in the vertical direction. The zigzag rails 52, 53, 54 and 55 are not identical. When the worm 56 is moving downward, the drive rings 121, 131, 141 and 151 of the input gears are initially driven to turn to the left along the rails to generate the first speed position as shown in FIG. 11-1, the drive ring 121 of the input gear 12 is, in the next step, driven to turn to the right to generate the second speed position as shown in FIG. 11-2, and then, the drive rings 131, 141 and 151 of the input gears 13, 14 and 15 are sequentially driven to turn to the right to generate the third speed, fourth speed and the top speed position respectively as shown in FIG. 11-3 through 11-5. Therefore, the microprocessor controls the forward shift mechanism 5 according to the revolving speed of the engine to achieve a continuously variable transmission.

Figure 12:
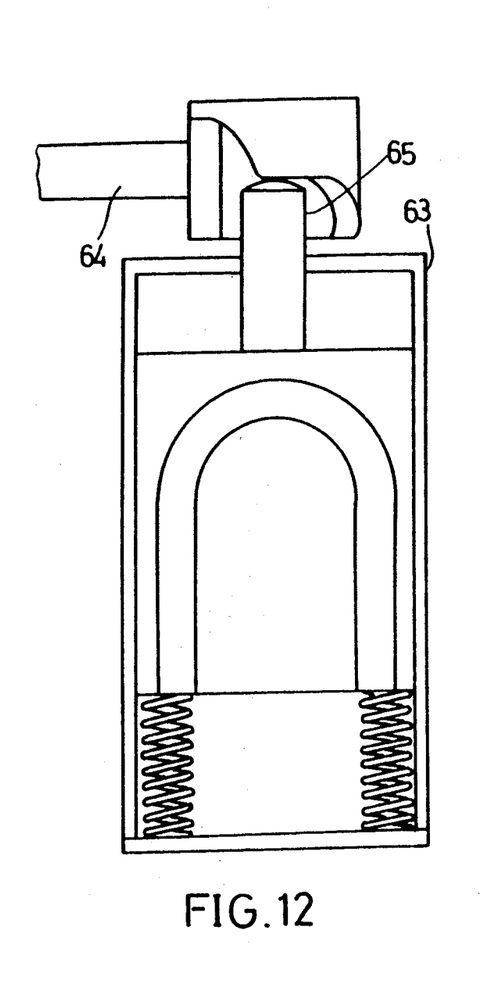
FIG. 12 is a side view of the shift selector.
Figure 13:
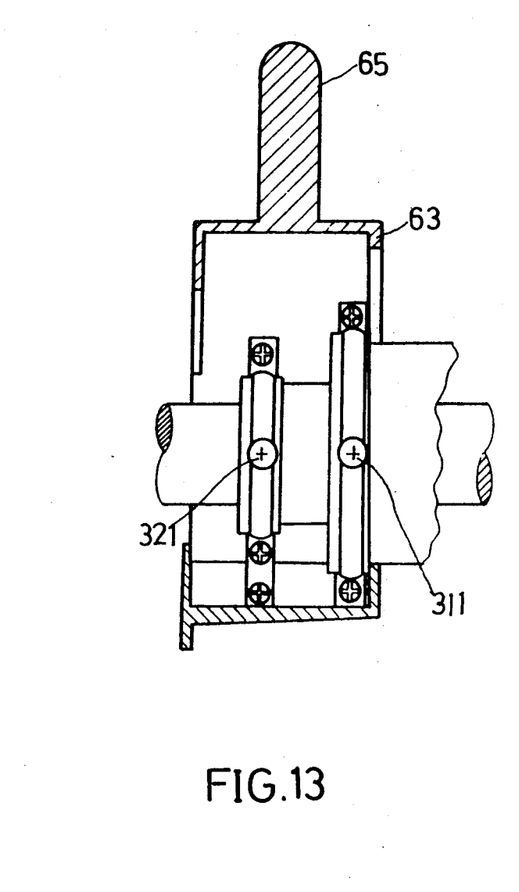
FIG. 13 is a sectional view of the shift selector.

Referring to FIG. 12 through 14, the shift selector includes two opposite zigzag rails 61 and 62, a body 63 and a gear shift lever 64. An elongated projection 65 is extended from the top of the body 63 along the moving direction of the opposite zigzag rails 61 and 62 to connect to the gear shift lever 64. The gear shift lever 64 is controlled by the car driver to drive the body 63 and the opposite zigzag rails 61 and 62 will control the drive rings 311 and 321 of the output shaft 31 and the back driven gear 32, which are set in the opposite rails 61 and 62, to be in a forward or backward or neutral shift position. When in a forward shift position, the spring 322 of the back driven gear 32 is twisted loose on the encircled portion of shaft 31 the spring 312 of the output shaft 31 is twisted tight, and the drive shaft 26 will only drive the output shaft 31 to rotate as shown in FIG. 14-1. When in a neutral shift position, the spring 312 of the output shaft 31 and the spring 322 of the back driven gear 32 are simultaneously twisted off, and the output shaft 31 is free from the drive shaft 26 and the back driven gear 32 as shown in FIG. 14-2. When in a backward shift position, the spring 312 of the output shaft 31 is twisted loose, and the spring 322 of the back driven gear 32 is twisted tight. Therefore, the drive shaft 26 does not drive the output shaft 31 and the input shaft 16 drives the back gear 4 to further let the idle gear 33 drive the output shaft 31 to rotate in a direction counter to the revolving direction during forward shift position.

Referring to FIG. 8, an oil inlet 262 is formed on a bearing 261. The lubricant is fed from the inlet 262 into an axial oil passage 263 disposed inside the drive shaft 26, and then respectively flows through the output gear assembly 2 and the actuating gear assembly 3 to lubricate inner springs and mechanism thereof.

As indicated, the structure herein may be variously embodied. Recognizing various modifications will be apparent, the scope hereof shall be deemed to be defined by the claims as set forth below.

What is claimed is:

1. A fully engaged power transmission, including: an input gear assembly comprising an input shaft and a plurality of input gears in different diameter and in number equal to speed steps available, said input gears being mounted on said input shaft;
   an output gear assembly comprising a drive shaft extending parallel to said input shaft, and a plurality of output gears in different diameter and in number equal to said input gears, said output gears being mounted on said drive shaft and respectively engaged with said input gears and arranged to provide transmission gear ratios for respective speed operation;
   an actuating gear assembly comprising an output shaft, a back driven gear, and an idle gear in continuous engagement with the back driven gear; said drive shaft being axially aligned with the output shaft and the back driven gear;
   a back gear mounted on said input shaft, and being continuously engaged with said idle gear;
   a forward shift mechanism driven in response to engine speed to control said input gears to separate from and couple with said input shaft so as to select the appropriate gears for power transmission according to the prevailing engine speed; and
   a manually operable shift selector for controlling the linking relation among said output shaft, said drive shaft and said back driven gear;
   said forward shift mechanism being operable to select one of said input gears to transmit power from said input shaft to said drive shaft, and said shift selector being selectively controlled to (a) let said drive shaft and said output shaft be linked to transmit output power in a forward shift position; or (b) let said output shaft be linked with said back driven gear to rotate in a reverse shift position; or (c) let said output shaft rotate relative to said drive shaft and said back driven gear in a neutral shift position.

2. A fully engaged transmission as set forth in claim 1, wherein said input shaft extends from the second smallest said input gear through the other said input gears of larger diameter in proper sequence from the third smallest to the largest; said power transmission further comprising individual torsion springs set in said input gears according to the sequence from the largest input gear toward the smallest input gear so that said springs are automatically torsionally tightened on the associated gears or released therefrom so as to transmit power or stop power transmission; said drive shaft extending from the smallest said output gear through the other said output gears of larger diameter in proper sequence from the second smallest output gear to the largest output gear.

3. A fully engaged transmission as set forth in claim 1, wherein the forward shift position, said input shaft is operatively linked to a selected input gear through other input gears operating at a lower speeds than the selected input gear, and said output shaft is operatively linked to the corresponding selected output gear through other output gears operating at higher speeds than the selected output gear.

4. A fully engaged transmission as set forth in claim 1, wherein each input gear except the smallest diameter input gear comprises an axially elongated bushing having a cam notch (1233) extending axially and circumferentially therealong, a torsion coil spring extending within each said bushing, a drive sleeve telescoped into each said brushing, and a stub tenon extending from each said drive sleeve into each said cam notch; each coil spring having its opposite ends connected to the associated brushing and sleeve, whereby axial motion of the sleeve along the inner surface of the brushing enables the tenon to have cam interaction with the cam notch so that the sleeve is rotated, to thereby exert a winding or unwinding force on the coil spring, depending on the direction of axial motion of the drive sleeve.

5. A transmission as recited in claim 1, and further comprising a first torsion coil spring clutch means (312) operatively located between said drive shaft and said output shaft, and a second torsion coil spring clutch means (322) operatively located between said back driven gear and said idle gear, each said clutch means being controlled by said shift selector.

6. The transmission of claim 5, wherein each said clutch means comprises a cylindrical clutch surface concentric with the axis of the aligned drive shaft and output shaft, and a torsion coil spring having a wound-up engaged position gripping the associated clutch surface and an unwound disengaged position released from the associated clutch surface.

7. A fully engaged transmission as set forth in claim 1, wherein said forward shift mechanism comprises a drive ring associated with each input gear and a plurality of zigzag rails for operating said drive rings to thereby control the connections between the input shaft and the individual input gears, and wherein said several zigzag rails of said forward shift mechanism are differently configured such that said drive rings of said input gears are arranged at different positions when they are set in said zigzag rails.

8. A fully engaged transmission as set forth in claim 7, wherein each input gear has a cylindrical clutch surface associated therewith; a torsion coil spring encircling each clutch surface so that each said spring can be torsionally tightened on the associated surface to form a driving connection; and an operating connection between each drive ring and each associated torsion spring.

9. A fully engaged transmission as set forth in claim 1, wherein a bearing is fitted to said drive shaft, and an oil inlet is formed on said bearing whereby lubricant is fed from said oil inlet and into an axial oil passage disposed inside said output gear assembly and said actuating gear assembly to lubricate the output gear assembly and aligned actuating gear assembly.

* * * * *